United States Patent Office 3,238,177
Patented Mar. 1, 1966

3,238,177
STABILIZATION OF ORGANIC SUBSTANCES
Joseph A. Chenicek, Long Grove, Ill., assignor to Universal Oil Products Company, Des Plaines, Ill., a corporation of Delaware
No Drawing. Original application Dec. 19, 1960, Ser. No. 76,475, now Patent No. 3,189,650. Divided and this application Oct. 5, 1964, Ser. No. 401,701
4 Claims. (Cl. 260—45.9)

This is a division of copending application Serial No. 76,475, filed December 19, 1960, now U.S. Patent No. 3,189,650, and relates to the stabilization of organic substances by incorporating therein a novel additive.

Many organic substances undergo undesired deterioration in storage, during transportation or in use due to oxidative reactions and/or due to the effect of ozone. Illustrative organic substances which undergo undesirable deterioration and may be stabilized in accordance with the present invention include gasoline, which may be saturated such as straight run gasoline, natural gasoline, hydro-reformed gasoline, etc., or unsaturated gasoline such as thermally cracked gasoline, catalytically cracked gasoline, coker gasoline, polymer gasoline, etc., or mixtures of saturated and/or unsaturated gasolines, naphtha, kerosene, jet fuel, gas oil, diesel oil, lubricating oil, fuel, oil, residual oil, which may be of petroleum or synthetic origin, grease, rubber, which may be natural rubber or synthetic rubber including SBR rubber, butyl rubber, Buna-N rubber, neoprene rubber, silicone rubber, Thiokol rubber, etc., adhesives, resins, plastics including polyethylene, polypropylene, polybutylene, etc., as well as edible mineral oils and edible and non-edible animal and vegetable fats and oils including lard, beef tallow, soy bean oil, linseed oil, castor oil, menhaden oil, etc., which may be partially or totally hydrogenated or otherwise treated, and solid food products containing the fat or oil.

In one embodiment the present invention is particularly applicable to the stabilization of rubber which, as hereinbefore set forth, may be natural or synthetic. Such rubber undergoes undesirable cracking due to ozone and also undesirable flex cracking, sun checking and other deterioration due to oxygen. Such deterioration may be retarded and/or prevented by means of the novel additive of the present invention. As hereinbefore set forth, the rubber may be natural or synthetic rubber and may be generally described as as rubbery polymer of a conjugated 1,3-diene, either as polymers or as copolymers thereof with other polymerizable compounds. Natural rubber includes hevea rubber, caoutchouc, balata, gutta percha, etc. Much of the synthetic rubber now being produced commercially is known in the art as SBR rubber and is a copolymer of styrene and butadiene Other synthetic rubbers have been hereinbefore set forth.

The present invention also is particularly applicable to the stabilization of gasoline in order to retard and/or prevent gum formation, discoloration and other deterioration of the gasoline.

The novel additive of the present invention is N,N'-bis - (1,3 - dimethyl - 3 - methoxybutyl) - p - phenylenediamine. This additive is very effective in preventing deterioration of organic subtsances and particularly of rubber and gasoline as hereinbefore set forth. The novel additive of the present invention is a solid at room temperature and accordingly offers numerous advantages in handling, transporting and using. For example, in the compounding of rubber, manufacturers prefer to work with solid ingredients. Because the compounder primarily handles solid ingredients, this available equipment is particularly suited for the weighing, handling and compounding of the solid ingredients. Accordingly, many compounders find advantages in working with solid additives.

Another advantage of the additive of the present invention relates to its use in gasoline. At the present time a particularly effective and extensively used antioxidant in gasoline is N,N'-di-sec-butyl-p-phenylene-diamine. This antioxidant is marketed as a liquid and also is classified as toxic and accordingly must be handled with care. In contrast, the additive of the present invention is a solid and is considerably less toxic. Accordingly, there is less hazard to the personnel working with this additive.

In one embodiment the present invention relates to a method of stabilizing an organic substance normally subject to deterioration which comprises incorporating in said organic substance a stabilizing concentration of N,N' - bis - (1,3- - dimethyl - 3 - methoxybutyl) - p-phenyl enediamine.

In a specific embodiment the present invention relates to a method of stabilizing rubber normally subject to cracking due to ozone which comprises incorporating in said rubber from about 1% to about 5% by weight of N,N' - bis - (1,3 - dimethyl - 3-methoxybutyl) - p - phenylenediamine.

In still another specific compound the present invention relates to a method of stabilizing gasoline normally subject to oxidative deterioration which comprises incorporating in said gasoline from about 0.0001% to about 1% by weight of N,N' - bis - (1,3 - dimethyl - 3 - methoxybutyl)-p-phenylenediamine.

In still another embodiment the present invention relates to an organic substance normally subject to deterioration containing a stabilizing concentration of N,N'-bis-(1,3-dimethyl-3-methoxybutyl)-p-phenylenediamine.

As hereinbefore set forth, the novel additive of the present invention is N,N' - bis - (1,3 - dimethyl - 3-methoxybutyl)-p-phenylenediamine. Although this compound may be prepared in any suitable manner, a particularly preferred method is by the reductive alkylation of p-phneylenediamine, p-nitroaniline and/or 1,4-dinitrobenzene with 4-methyl-4-methoxy-2-pentanone. The reductive alkylation may be effected in any suitable manner. A suitable catalyst for effecting the reaction comprises a mixture of the oxides of chromium, cobalt and barium although other suitable catalysts may be employed. Other catalysts include those containing cobalt, nickel, platinum, molybdenum, etc. In general, the reaction is effected at an elevated temperature of from about 200° to about 500° F. and a hydrogen pressure of from about 50 to about 3000 pounds per square inch.

As hereinbefore set forth, the preferred additive of the present invention is N,N'-bis-(1,3-dimethyl-3-methoxybutyl)-p-phenylenediamine. In another embodiment, the novel additive is N-(1,3-dimethyl-3-methoxybutyl)-N'-R-p-phenylenediamine in which R is selected from the group consisting of alkyl, aralkyl, aryl, alkaryl and cycloalkyl. In this embodiment at least one substituent attached to a nitrogen atom must be a 1,3-dimethyl-3-methoxybutyl substituent. Compounds in which R in the above formula is aryl are preferred in this embodiment and include compounds as N-(1,3-dimethyl-3-methoxybutyl)-N'-phenyl-p-phenylene-diamine, N - (1,3-dimethyl-3-methoxybutyl)-N'-tolyl-p-phenylenediamine, N-(1,3 - dimethyl - 3 - methoxybutyl) - N' - xylyl - p-phenylenediamine, N-(1,3-dimethyl-3-methoxybutyl)-N'-ethylphenyl-p-phenylenediamine, N-(1,3-dimethyl-3 - methoxybutyl)-N'-propylphenyl - p - phenylenediamine, N-(1,3 - dimethyl - 3 - methoxybutyl) - N' - butylphenyl-p-phenylenediamine, etc. Other illustrative compounds in which R is selected from alkyl, aralkyl, alkaryl and cycloalkyl include N - (1,3-dimethyl-3-methoxybutyl) - N'- isopropyl-p-phenylenediamine, N-(1,3 - dimethyl - 3 - methoxybutyl)-N'-sec-butyl-p-phenylenediamine, N-(1,3-dimethyl-3-methoxybutyl)-N' - sec - pentyl - p - phenylenediamine, N-(1,3-dimethyl-3-methoxybutyl)-N'-sec-hexyl-p-phenylenediamine, N-(1,3-dimethyl-3-methoxybutyl)-N'-sec-heptyl-p-phenylenediamine, N-(1,3-dimethyl - 3 - methoxybutyl) N'-sec-octyl-p-phenylenediamine, N - (1,3-dimethyl-3-methoxybutyl)-N'-sec-nonyl - p - phenylenediamine, N-(1,3-dimethyl-3-methoxybutyl)-N'-sec-decyl-p-phenylenediamine, N-(1,3,-dimethyl-3-methoxybutyl)-N'-sec-undecyl-p-phenylenediamine, N-(1,3-dimethyl - 3 - methoxybutyl)-N'-sec-dodecyl-p-phenylenediamine, etc., N-(1,3 - dimethyl - 3 - methoxybutyl) - N' - benzyl - p-phenylenediamine, N-(1,3-dimethyl-3-methoxybutyl)-N'-phenethyl-p-phenylenediamine, N-(1,3-dimethyl - 3 - metoxybutyl)-N'-phenpropyl-p-phenylenediamine, N-(1,3-dimethyl - 3 - methoxybutyl) - N' - phenbutyl - p - phenylenediamine, N - (1,3-dimethyl-3-methoxybutyl)-N'-phenpentyl-p-phenylenediamine, N - (1,3-dimethyl-3-methoxybutyl) - N'-phenhexyl-p-phenylenediamine, N - (1,3 - dimethyl - 3 - methoxybutyl) - N' - phenheptyl - p - phenylenediamine, N-(1,3-dimethyl-3-methoxybutyl)-N' - phenoctyl-p-phenylenediamine, etc., N-(1,3-dimethyl - 3 - methoxybutyl)-N'-cyclopentyl-p-phenylenediamine, N - (1,3-dimethyl - 3 - methoxybutyl)-N'-cyclohexyl-p-phenylenediamine, etc. It is understood that the various compounds in this embodiment of the invention are not necessarily equivalent but all of them will be effective in stabilizing rubber and other organic substrates.

As hereinbefore set forth, the novel additive of the present invention is used as an additive to retard and/or prevent deterioration of organic substances. The additive is used in a small but sufficient concentration to obtain the desired stabilization, which concentration generally is within the range of from about 0.0001% to about 5% by weight, depending upon the specific organic substance being stabilized. For example, when used in rubber, the additive generally is utilized in a concentration of from about 1% to about 5% by weight of the rubber hydrocarbon. When used in gasoline or other hydrocarbon distillates or fatty materials, the additive is used in a concentration of from about 0.0001% to about 1% by weight thereof. When desired, the additive of the present invention may be prepared as a physical mixture with one or more other solid additives to be incorporated in the specific organic substrate being stabilized.

It is understood that the additive may be incorporated in the organic substance in any suitable manner. For example, when incorporated in a liquid organic substance, the additive is added to the liquid and then preferably is suitably agitated to obtain uniform distribution therein. When the additive is incorporated in a compounded substrate, the additive may be mixed with one or more of the ingredients and then processed therewith into the final composition or the additive may be incorporated as a final step in the compounded material. For example, when the additive is to be incorporated in rubber, it may be added either alone or with one or more of the other ingredients and compounded in this manner into the mix prior to vulcanization thereof. In another embodiment the additive may be applied in the form of dust or spray onto vulcanized rubber products. As another example, when the additive is to be incorporated into grease, it may be mixed with one or more of the ingredients prior to final compositing into the grease product.

It is understood that the additive of the present invention may be used along with other additives incorporated in the organic substances. For example, when used in rubber, the additive in the present invention may be used along with other antioxidants such as phenyl-beta-naphthylamine, 6-phenyl-2,2,4-trimethyl-1,2-dihydroquinoline, marketed under the trade name of "Santoflex–B," 2,2'-methylene-bis-(4-methyl-6-tert-butylphenyl), 2,6 - di-tert-butyl-p-cresol, the reaction product of acetone and diphenylamine, marketed under the trade name of "B.L.E.," etc. These antioxidants generally are used in a concentration from about 0.5% to about 3% by weight of the rubber. Also, the additive may be used along with paraffin and/or microcrystalline wax, these generally being used in a concentration of 0.5% to about 3% by weight of rubber.

It is understood that the rubber which is stabilized in accordance with the present invention includes rubber used for automobile tires and tubes, hose, belting, sheet and thread rubber, rubberized fabrics, molded goods, boots and shoes, etc., whether vulcanized in a mold, in open steam, in hot air, or in the cold by the so-called acid process.

The following examples are introduced to illustrate further the novelty and utility of the present invention but not with the intention of unduly limiting the same.

EXAMPLE I

N,N' - bis-(1,3-dimethyl-3-methoxybutyl)-p-phenyleneamine was prepared by the reductive alkylation of p-phenylenediamine with 4-methyl-4-methoxy-2-pentanone. The preparation was made as follows: 108 grams of p-phenylenediamine, 650 grams of 4-methyl-4-methoxy-2-pentanone and 100 grams of a platinum-alumina catalyst containing approximately 0.4% by weight of platinum were supplied to a rocking autoclave, which then was pressured with 120 atmospheres of hydrogen and heated to 320° F. The reaction at this temperature was continued for 6 hours, after which the autoclave was cooled and the products were withdrawn, filtered to remove the catalyst and then distilled on a steam bat at 50 mm. pressure to remove excess ketone. 280 grams of a light colored crystalline solid were recovered, the solid having a melting point of 176° F. The solid was analyzed and found to have a nitrogen equivalent of 174 which corresponds to the theoretical nitrogen equivalent of 168 for N,N'-bis-(1,3-dimethyl-3-methoxybutyl)-p-phenylenediamine.

EXAMPLE II

N,N'-bis-(1,3-dimethyl-3-methoxybutyl)-p-phenylenediamine is used as an inhibitor in a gasoline comprising a blend of catalytically reformed and catalytically cracked gasolines. The gasoline without inhibitor has an induction period of 240 minutes. Upon the addition of 0.002% by weight of N,N'-bis-(1,3-dimethyl-3-methoxybutyl)-p-phenylenediamine to another sample of the gasoline, the induction period of the gasoline is increased to 473 minutes.

EXAMPLE III

N,N'-bis-(1,3-dimethyl-3-methoxybutyl)-p-phenylenediamine is used as an antiozonant in SBR rubber. 2.5% by weight of N,N'-bis-(1,3-dimethyl-3-methoxybutyl)-p-phenylenediamine is incorporated in a commercial rubbery composition containing the usual ingredients including carbon black, zinc oxide, sulfur, etc. The ingredients are combined on a rubber mill in the conventional manner and then the mixture is cooled.

A sample of the rubber without additive and a sample of the rubber containing N,N'-bis-(1,3-dimethyl-3-methoxybutyl)-p-phenylenediamine may be evaluated in a number of different ways to determine the effect of ozone on the rubber. In one method the samples of the rubber are cut in strips of 1 inch by 4 inches and then evaluated either in indoor or outdoor exposure tests. In the indoor test, the rubber samples are elongated and mounted on varnished wooden panels, after which they are inserted in an ozone cabinet and exposed to an atmosphere containing 50 parts of ozone per 100 million parts of air at 100° F. In the outdoor exposure tests, the strips of rubber are bent double and mounted on a board and then samples are exposed to outdoor weather.

When evaluated by both of the methods outlined above, the samples of rubber containing N,N'-bis-(1,3-dimethyl-3-methoxybutyl)-p-phenylenediamine resists cracking due to ozone for a considerably longer period of time than the 2 hours for the sample of rubber without additive in the ozone cabinet and the less than one week for the sample of rubber without additive in the outdoor exposure test before the occurrence of first crack in these samples.

EXAMPLE IV

Because the product prepared as described in Example I contains two asymmetric carbon atoms separated by a plane of symmetry, it is expected that the product would be separable into two isomers having different melting points. Accordingly, a product prepared in the manner described in Example I was subjected to fractional crystallization by extraction in pentane-acetone solvent and two fractions were recovered, one melting at 140° F. and the other melting at 225° F. These fractions were analyzed and found to have nitrogen equivalents of 167 and 169, respectively, which correspond to the theoretical nitrogen equivalent of 168.

EXAMPLE V

The isomer having a melting point of 140° F. was evaluated as an antiozonant in SBR rubber having the following recipe:

*Table I*

| Ingredient: | Parts by weight |
| --- | --- |
| SBR 1502 | 100 |
| Carbon black | 40 |
| Zinc oxide | 3 |
| Stearic acid | 2 |
| Sulfur | 2 |
| Santocure[1] | 1.25 |
| Additive | as indicated |

[1] N-cyclohexyl-2-benzothiazolesulfenamide.

The rubber was cured for 40 minutes at 284° F. and then was cut into test strips of 1 inch by 4 inches. The test strips were elongated 10% in one series and 20% in another series and then mounted on varnished wooden panels. The panels were placed in an ozone cabinet and subjected to an atmosphere containing 50 parts of ozone per 100 million parts of air at 100° F. and the time to first crack is noted. The results of these evaluations and of a control sample of the rubber (not containing the antiozonant) are reported in the following table:

*Table II*

| Concentration of Antiozonant, Percent by Weight | Huors to First Crack | |
| --- | --- | --- |
|  | 10% Elongation | 20% Elongation |
| None | <1 | <1 |
| 2 | >168 | ~84 |
| 3 | >168 | >168 |
| 4 | >168 | >168 |

It will be seen that the sample of rubber not containing the antiozonant underwent cracking in less than 1 hour. On the other hand, the samples of rubber containing the antiozonant of the present invention were considerably improved.

EXAMPLE VI

The isomer having a melting point of 225° F. and recovered as described in Example IV also was evaluated in SBR rubber in the same manner as described in Example V.

The results of these evaluations are reported in the following table:

*Table III*

| Concentration of Antiozonant, Percent by Weight | Hours to First Crack | |
| --- | --- | --- |
|  | 10% Elongation | 20% Elongation |
| None | <1 | <1 |
| 3 | >168 | >168 |
| 4 | >168 | >168 |

Here again it will be noted that the antiozonant in the present invention was very effective in retarding cracking of the rubber.

EXAMPLE VII

The isomer melting at 225° F. and recovered as described in Example IV also was evaluated in a heavy duty natural rubber of the following recipe:

*Table IV*

| Ingredient: | Parts by weight |
| --- | --- |
| Smoked sheet | 100 |
| Carbon black | 45 |
| Zinc oxide | 3.1 |
| Stearic acid | 3 |
| Sulfur | 2.5 |
| Santocure[1] | 0.75 |
| Additive | As indicated |

[1] N-cyclohexyl-2-benzothiazolesulfenamide.

The rubber preparations were processed in the conventional manner, cut into strips and evaluated in the same manner as described in Example V. The results are reported in the following table:

*Table V*

| Concentration of Antiozonant, Percent by Weight | Hours to First Crack | |
| --- | --- | --- |
|  | 10% Elongation | 20% Elongation |
| None | ~1.5 | <1 |
| 4 | >168 | >168 |
| 5 | >168 | >168 |

The hours to first crack reported above relate to surface cracks. In the case of the samples of rubber containing 4% and 5% by weight, respectively, of the antiozonant, edge cracks were noted at about 40 hours in the samples which were elongated 20% and >168 hours in the samples which were elongated 10%. Thus it will be seen that the antiozonant was very effective in stabilizing the rubber against cracking.

EXAMPLE VIII

N,N' - bis - (1,3 - dimethyl-3-methoxybutyl)-p-phenylenediamine is used as an antioxidant in synthetic lubricating oil. The synthetic lubricating oil is dioctyl sebacate and the antioxidant is incorporated therein in a concentration of 1% by weight. The dioctyl sebacate then is utilized as a lubricant in high temperature service. This additive serves to prevent oxidative deterioration of the lubricant during such use as determined by analyses of the used oil. These analyses include determination of the Induction Period (hours to 5 pound pressure drop) according to ASTM Method D942 and also the percent insoluble in isooctane and the percent change in viscosity.

EXAMPLE IX

N,N' - bis - (1,3 - dimethyl-3-methoxybutyl)-p-phenylenediamine is used as an additive in lithium base grease. The grease is prepared by mixing 91% of a Pennsylvania bright stock with 8% of lithium stearate. The mixture is heated at about 450° F. with agitation. Subsequently, the grease is cooled to 320 F. while agitating and, at this temperature, 1% by weight of N,N'-bis-(1,3-dimethyl-3-methoxybutyl)-p-phenylenediamine is added. Agitation is continued and the mixture then is cooled to about 250° F. and the grease then further cooled slowly to room temperature.

The stability of the grease is tested according to a modified Norma Hoffman method in which a sample of the grease is placed in a bomb in the presence of brass discs acting as an oxidation catalyst, and oxygen is charged thereto. The bomb then is heated to 212° F., and the time required for a drop of five pounds pressure is taken as the Induction Period. When so evaluated, a control sample of the grease (not containing this additive) has an induction period of 10.5 hours. On the other hand, the Induction Period of the sample of grease containing 1% by weight of N,N'-bis-(1,3-dimethyl-3-methoxybutyl)-p-phenylenediamine is considerably increased.

I claim as my invention:

1. A rubbery polymer of a conjugated 1,3-diene normally subject to deterioration due to ozone containing a stabilizing concentration of N-(1,3-dimethyl-3-methoxybutyl)-N'-R-p-phenylenediamine where R is selected from the group consisting of alkyl, aralkyl, aryl, alkaryl and cycloalkyl.

2. A rubbery polymer of a conjugated 1,3-diene normally subject to cracking due to ozone containing from about 1% to about 5% by weight of N,N'-bis-(1,3-dimethyl-3-methoxybutyl)-p-phenylenediamine.

3. A rubbery polymer of a conjugated 1,3-diene normally subject to cracking due to ozone containing a stabilizing concentration of N,N'-bis-(1,3-dimethyl-3-methoxybutyl)-p-phenylenediamine.

4. A rubbery copolymer of butadiene and styrene containing a stabilizing concentration of N,N'-bis-(1,3-dimethyl-3-methoxybutyl)-p-phenylenediamine.

References Cited by the Examiner
UNITED STATES PATENTS

| | | | |
|---|---|---|---|
| 2,684,893 | 7/1954 | Hughes et al. | 260—573 |
| 2,797,152 | 6/1957 | Hughes et al. | 260—573 |
| 2,867,604 | 1/1959 | Rosenwald et al. | 260—577 |

DANIEL E. WYMAN, *Primary Examiner.*